United States Patent
Tuononen et al.

(10) Patent No.: US 8,213,441 B2
(45) Date of Patent: Jul. 3, 2012

(54) GLOBAL REACHABILITY IN COMMUNICATION NETWORKS

(75) Inventors: Janne Tuononen, Helsinki (FI); Petteri Pöyhönen, Helsinki (FI)

(73) Assignee: Nokia Corporation, Espoo (FI)

( * ) Notice: Subject to any disclaimer, the term of this patent is extended or adjusted under 35 U.S.C. 154(b) by 470 days.

(21) Appl. No.: 11/979,505

(22) Filed: Nov. 5, 2007

(65) Prior Publication Data

US 2008/0159312 A1 Jul. 3, 2008

(30) Foreign Application Priority Data

Nov. 6, 2006 (EP) ..................................... 06123528

(51) Int. Cl.
*H04L 12/28* (2006.01)
*H04L 12/56* (2006.01)
(52) U.S. Cl. ....................................................... 370/401
(58) Field of Classification Search ........................ None
See application file for complete search history.

(56) References Cited

U.S. PATENT DOCUMENTS

| 6,549,522 | B1 * | 4/2003 | Flynn ............................. 370/313 |
| 7,453,850 | B2 * | 11/2008 | Yang et al. ..................... 370/331 |
| 2004/0137888 | A1 * | 7/2004 | Ohki ............................. 455/417 |

* cited by examiner

*Primary Examiner* — Chirag Shah
*Assistant Examiner* — Srinivasa Reddivalam
(74) *Attorney, Agent, or Firm* — Alston & Bird LLP

(57) ABSTRACT

A method for handling connections of a first node located in a first network having a private address space is described. The method comprises receiving a service query for requesting a service concerning the first node from a second node, the service query comprising a global identifier of the first node, obtaining a local identifier of the first node for identifying the first node in the first network, sending the local identifier of the first node to a network element providing a connection to the first node, receiving a public identifier of the network element, and sending the public identifier of the network element to the second node. In this way, global reachability of nodes also in private networks can be achieved.

12 Claims, 6 Drawing Sheets

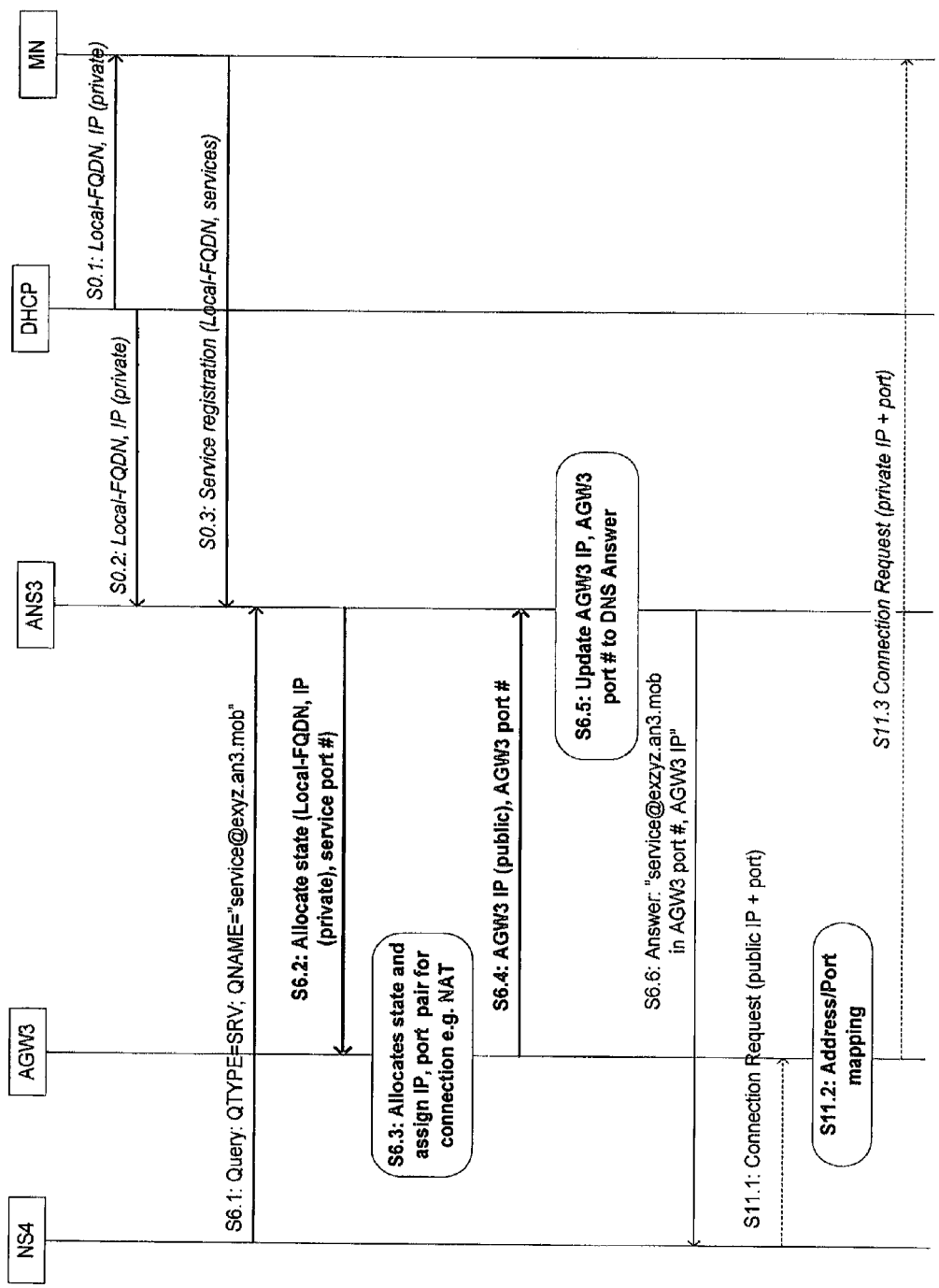

GLOBAL REACHABILITY IN COMMUNICATION NETWORKS

BACKGROUND OF THE INVENTION

1. Field of the Invention

The invention relates to a method as well as a network element such as a name server, a gateway device and a mobile node by which a global reachability in communication networks can be achieved.

2. Description of the Related Art

Host reachability is an essential function in all networks and especially in the mobile networks. Location updates are integral part of any the reachability solution—whenever a host changes its location in the network, namely its IP (Internet Protocol) address, its reachability information needs to be updated.

However, it is a very rare occasion, if not non-existent, that an IP packet is sent without payload carrying transport layer header and some application data. This means that host reachability itself is not sufficient for end user's communication needs, but also service reachability needs to be considered. In other words, in the case of host reachability it is actually a service in the specific host, the peer is trying to reach, not just the host.

Services/applications are identified on transport layer via port numbers, e.g. HTTP (HyperText Transfer Protocol) uses typically port number 80 or 8080. When port mapping is not happening on the packet route (typical in public IP domain), it is enough for service reachability to get only the host's locator information (IP address), because the port numbers that the applications use have no role in packet forwarding. Locator information in this case is typically retrieved from a DNS (domain name system) framework by using A type query (domain name→IP address mapping). Therefore, the term host reachability is used, because location of the service in host is well-known via service specific port number.

The situation is different when port mapping happens on the packet route (typical case in the NA(P)T (network address (port) translation) box). Port mapping means that applications in the connecting peer can no longer reach services provided by the host behind the NA(P)T by using well-known service port numbers, because of the common NA(P)T traversal mechanism, where connections are mapped in NA(P)T with (NA(P)T IP, port number) pair.

Moreover, the existence of a NA(P)T is a sign of the fact that the network behind it is having a private address space, which means that the host located there cannot be reached trivially by using public domain scenario methods. Namely, private IP addresses are not routable in the public domain.

At present, domain name system (DNS) is only available globally viable framework that can provide reachability for an IP host.

The current IPv4 based Internet is running short of addresses. More and more addresses are required due to, for example, mobile nodes are becoming IP nodes in the next generation of mobile networks. Also, countries like China and India are in the middle of Internet revolution and require addresses.

Evidently, IPv6 is long-term solution to address shortage, but coming of IPv6 is still somewhere in the future. To tackle the issue, quicker several middle-box solution have been developed. In these solutions, networks are divided into one public Internet and innumerous private networks that share same address spaces. NA(P)T is the most widely used middle-box solution.

Private networks behind middle-boxes, like NA(P)T, have one major problem: hosts connected to these networks are not reachable from the public network. That is, the host itself must initiate all connections. This has been somewhat acceptable in the past where application have been mainly of a client-server type, and a client always initiates the service request. However, the reachability issue is becoming more important, once peer-to-peer communication paradigm is becoming more common and this requires host (and service) reachability despite of the host location to be feasible.

There are some specific solutions defining how mobile IP can be used when MNs are located in a private address space and a home agent is located in public address space. However, there is no known prior-art generic host/service reachability solution for scenario where access network uses private IP address space.

SUMMARY OF THE INVENTION

Thus, an object of embodiments of the present invention is to provide reachability in an access network using a private address space.

According to an aspect of the invention, a method for handling connections in a communication system, may comprise receiving a service query for requesting a service concerning a first node, located in a first network having a private address space, from a second node, the service query comprising a global identifier of the first node, obtaining a local identifier of the first node for identifying the first node in the first network, sending the local identifier of the first node to a network element providing a connection to the first node, receiving a public identifier of the network element, and sending the public identifier of the network element to the second node.

According to another aspect of the invention, a network element may comprise a receiver configured to receive a service query for requesting a service concerning a first node located in a network having a private address space from a second node, the service query comprising a global identifier of the first node, a controller configured to obtain a local identifier of the first node for identifying the first node in the first network, a sender configured to send the local identifier of the first node to a network element providing a connection to the first node, wherein the receiver is further configured to receive a public identifier of the network element, and the sender is further configured to send the public identifier of the network element to the second node.

According to a further aspect of the invention, a method for handling connections in a communication system, may comprise receiving a request for allocating a state, the request comprising a local identifier of a first node, located in a first network having a private address space, for identifying the first node in the first network, allocating a state in which a mapping between the public identifier of a network element providing a connection to the first node and a private identifier of the first node is established, and sending the public identifier of the network element to a network node from which the request was received.

According to a further aspect of the invention, a network element may comprise a receiver configured to receive a request for allocating a state, the request comprising a local identifier of the first node for identifying a first node in a first network having a private address space, a controller configured to allocate a state in the network element in which a mapping between the public identifier of the network element and a private identifier of the first node is established, and a sender configured to send the public identifier of the network element to another network element having sent the request.

According to another aspect of the invention, a method for obtaining connection information to a first node located in a first network having a private address space, may comprise
 sending a service query to a name server, the service query comprising a global identifier of the first node, and
 receiving an answer comprising a public identifier of a network element providing a connection to the first node.

According to a further aspect of the invention, a node may comprise a sender, a receiver and a controller, wherein the controller may be configured to the controller is configured to control the sender to send a service query to a name server, the service query comprising a global identifier of a first node located in a first network having a private address space, and the receiver may be configured to receive an answer comprising a public identifier of a network element providing a connection to the first node.

According to a further aspect of the invention, a communication system may comprise a name server, a first node, a second node and a network element providing a connection to the first node. The first node may be located in a first network having a private address space, the second network node may be configured to send a service query for requesting a service concerning the first node to the name server, the service query comprising a global identifier of the first node, the name server may be configured to obtain a local identifier of the first node for identifying the first node in the first network, and to send the local identifier of the first node to the network element providing a connection to the first node, the network element may be configured to allocate a state in which a mapping between a public identifier of the network element and the private identifier of the first node is established, and to send the public identifier of the network element to the name server, and the name server may be configured to send the public identifier of the network element to the second node.

According to another aspect of the invention, a network element may comprise means for receiving a service query for requesting a service concerning a first node located in a network having a private address space from a second node, the service query comprising a global identifier of the first node, means for obtaining a local identifier of the first node for identifying the first node in the first network, means for sending the local identifier of the first node to a network element providing a connection to the first node, means for receiving a public identifier of the network element, and means for sending the public identifier of the network element to the second node.

According to another aspect of the invention, a network element may comprise means for receiving a request for allocating a state, the request comprising a local identifier of the first node for identifying a first node in a first network having a private address space, means for allocating a state in the network element in which a mapping between the public identifier of the network element and a private identifier of the first node is established, and means for sending the public identifier of the network element to a network node having sent the request.

According to another aspect of the invention, a node may comprise means for sending a service query to a name server, the service query comprising a global identifier of a first node located in a first network having a private address space, and means for receiving an answer comprising a public identifier of a network element providing a connection to the first node.

Thus, a network element providing a connection to the first node knows the mapping between a private identifier of a network node located in a private network and the public identifier of the network element. Hence, the network element (which may be a gateway device, for example) can forward traffic to the network node located in the private network. The second node may use the public identifier of the network element in order to contact the first node.

Further advantageous developments are set out in the dependent claims.

BRIEF DESCRIPTION OF THE DRAWINGS

Embodiments of the invention are described by referring to the enclosed drawings, in which:

FIG. 4 shows a more detailed process for some steps shown in FIG. 3, FIGS. 5A to 5C show examples for structures of a mobile node, a name server and gateway device according to the first embodiment of the present invention.

DETAILED DESCRIPTION OF THE EMBODIMENTS

Figure 1:
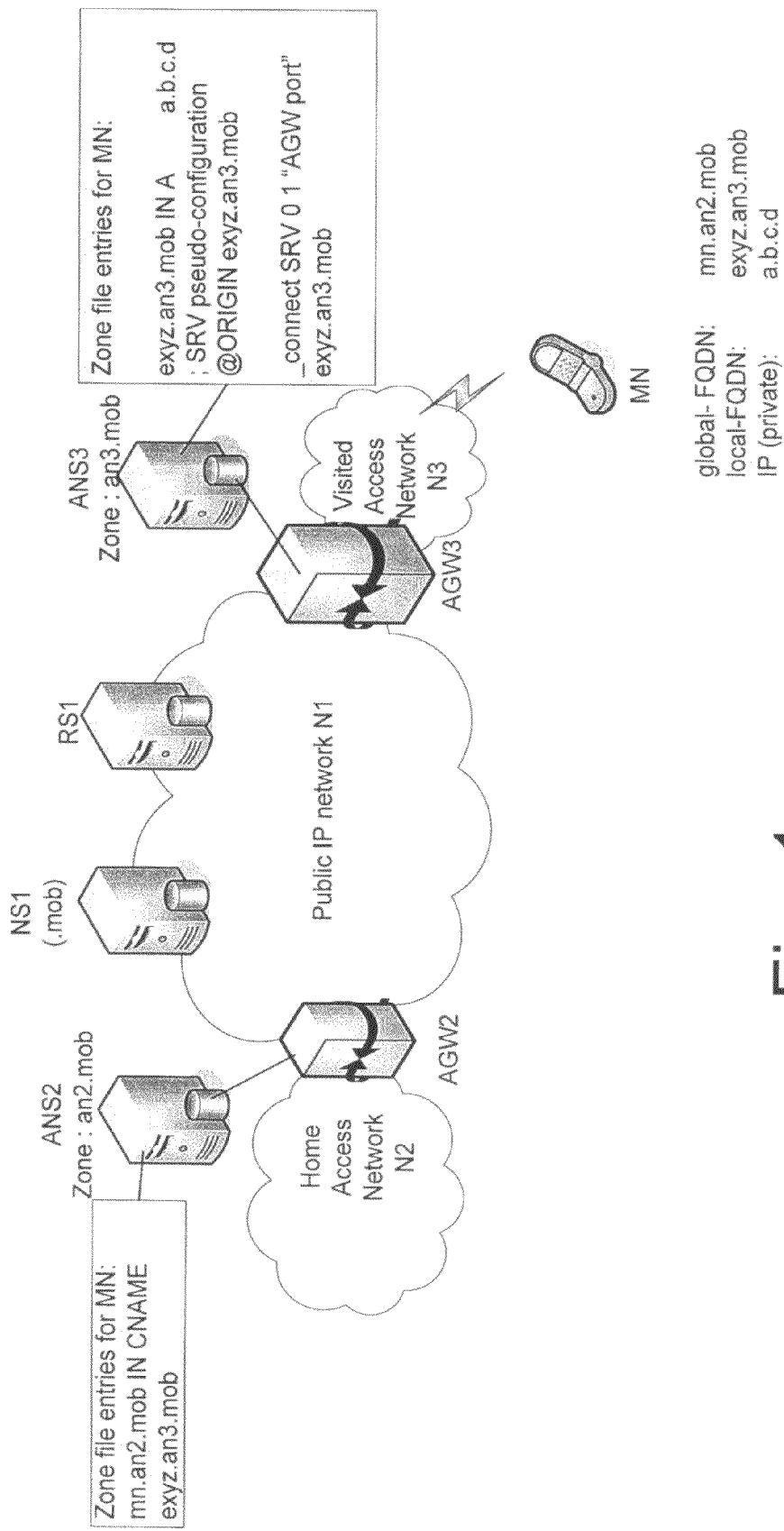
FIG. 1 shows a domain name system setup in a private IP scenario when a mobile node is roaming according to a first embodiment of the present invention.

In the following, embodiments of the present invention are described by referring to the attached drawings.

According to several embodiments, the procedure according to the invention can be carried out in a network system comprising at least one private network and a public network, which both may be internet protocol (IP) networks. The public network may comprise a name server (e.g., a domain name system (DNS) server), and a gateway device (e.g., an access gateway (AGW)) may be provided as a gateway for the private network. In the following, a scenario is described as an example, in which a first node is located in the private network. That is, the private address used by the first node in the private network is not reachable from the public network. Now, a second node located in the public network tries to contact the first node, for example, in order to establish a connection.

It is noted that it does not matter whether the second node is located in private or public network. This only illustrates that a service request to the first node is coming from the public IP network direction. This is a typical use case in current Internet, when both endpoints for connection are located in different private IP access networks and public IP network (Internet) is used to route packet, such as service requests, between the private networks.

Moreover, it is noted that the gateway device mentioned above is only an example for a network element providing a connection to the first node.

According to the present embodiment, whenever the name server (e.g., DNS) gets a service request originated from the public IP network (e.g., by the second node, which may be located in the public IP network or in another private network connected to the public IP network), the name server sends the service port and the private address (e.g., IP address) of the first node (also referred to as host) located in the private network (which may be a private IP network), which is able to provide the service, to the gateway device (e.g., an Access Gate Way (AGW, i.e. Middle-box)). The gateway device shall give its port and public address (e.g., public IP address) to the name server. Thus, the mapping table between the public address plus the port of the gateway and the private address plus the service port of the first node located in the private network is established. Hence the service request can be served.

This is described in the following in more detail by referring to a first embodiment of the present invention illustrated in FIGS. 1 to 5.

In particular, according to the first embodiment, standard reachability information or address information (such as standard DNS (A, AAAA, A6,), CNAME and SRV (alternatively NAPTR) Resource Records (RRs) are used in order to enable global host and service reachability in heterogeneous environment, which possibly contains uncoordinated (private) address domains. As part of the solution, required reachability information maintenance and location updates in the invention are done by using standard dynamic DNS updates.

According to the present embodiment, it is assumed that all name servers (NS) are connected to the public IP backbone. Furthermore, dynamic DNS (DynDNS) is supported on the second level domain (SLD) level and below that.

It is noted that the present embodiment is not limited to to DynDNS. That is, if DynDNS support is not preferred or available, also other proprietary methods could be used. Namely, the present embodiment requires DynDNS support only in authoritative name servers managing host domain names in each private access network and home network ANS. This is to say that SLD server require DynDNS support in this specific example case of the present embodiment only, because example domain name hierarchy is so flat that SLD is actually the ANS (authoritative name server) for the private access network.

Furthermore, it is assumed that the first node or host has a globally unique fully qualified domain name (FQDN) assigned by the home domain. In the first embodiment, this fully qualified domain name is also referred to as global-FQDN and is an example for a global identifier. This global-FQDN is a host identity in the public domain providing host reachability in global scope.

In roaming case, the serving access network assigns another FQDN for host (local-FQDN). This local-FQDN is a host identity within the access network and is an example for a local identifier. It may have also global significance, but it does not matter since it is not used for global host reachability according to the first embodiment.

As mentioned, the target environment for the present embodiment are (access) networks having private IP address space that connects to public IP network. These networks are a majority among current IP networks. Also in the future it may be that Internet service providers (ISPs) and operators want to use middle-boxes even IPV6 is in use, due to additional features they provide.

As already mentioned above, reachability for this scenario is generic problem in current Internet. Common solution to enable connectivity is to have network address (port) translation (NA(P)T) box that provides connectivity between public and private networks by providing mapping of connections from the private network to (public IP, port number) pair in the NA(P)T box. However standard NA(P)Ts do not support reachability for network initiated connections and this is perhaps the main reason why each application overlay/framework solves this in its own way whenever it is needed; e.g. in many cases, these solutions are based on clients ability to register in order to be reachable. But there is no generic application/service agnostic solution.

The first embodiment describes, for both host and service reachability, a way how required connectivity information of middle-box is provided to the node that is trying to connect host in the private network, and how/when middle-box in the serving network maps public domain information to private domain information.

Thus, according to the present embodiment, connectivity information is obtainable. For example, in a NA(P)T case, this information is the NA(P)T's IP address, the port number to which the host is connected in NA(P)T and the host's private IP. Another example is a gateway device, in particular a gateway device in which the NA(P)T is integrated.

According to the present embodiment, a generic (non application specific) solution is provided for provisioning of connectivity information, which is based on state negotiation between the gateway device (e.g., the middle-box or AGW) and the name server (e.g., DNS server), as illustrated in FIG. 4 to be described later.

In the following, a reachability solution for a roaming host according to the present embodiment, i.e., a solution for host and service reachability according to the embodiment is described in more detail. In particular, in the home zone of the first node (host), an authoritative name server (ANS) CNAME resource record (RR) is used to provide global-FQDN→local-FQDN mapping. It is noted that the CNAME resource record provides a mapping for alias names. If the local-FQDN changes, a domain name system (DNS) server update such as a dynamic DNS (DynDNS) update is used. Updater may be host itself (typically) or some node in the serving network (optional).

In the serving zone, for each roaming host, following information is maintained in serving zone ANS:

A RR (resource record of the type "A" (IPv4 address))
This includes local-FQDN IN A "local-private-IP"
SRV RR per "service"
This includes "Service" TTL Class SRV Priority Weight "Service Port" "local-FQDN".
The service port is the actual port services used by service specific application in the host. For example, for http the port number is #80.

The mapping as provided in the gateway device (e.g., the AGW) is as follows:

(middle-box public parameters)<-->(host private parameters)

In the following, a host name resolution is described:

Typically in DNS, host name resolution is enabled with type A DNS query. According to the present embodiment, this behavior is changed and a node (e.g., the second node described above, also referred to as peer in the following) trying to contact the first node (host) uses a service location query (QType=SRV) for "name resolution".

For example, a query for the service "connect" would be connect@global-FQDN that in the process turns into connect@local-FQDN. The service query (SRV query) may be triggered e.g. by key word in the domain name.

FIG. 1 shows an example domain name system (DNS) setup in private IP scenario (port mapping, e.g. by using NAT/NAPT) when the host (e.g., a mobile node) is roaming.

In this example, three networks are involved: a public IP network N1, a home access network N2 of a mobile node MN, and a visited access network N3, in which the mobile node MN is currently located. The visited access network N3 is a private IP network.

The public IP network N1 comprises a root server RS1 and a top level domain (TLD) name server NS1, in this example for .mob.

The home access network comprises an access gateway AGW2 and an authoritative sub level domain (SLD) name server ANS2 (in the following also simply referred to as name server ANS2). The name server ANS2 is the authoritative name server for the zone an2.mob, which is the home zone or home access network of the mobile node MN in this example. The name server ANS2 holds the following zone file entries for the mobile node MN:

mn.an2.mob IN CNAME esyz.an3.mob

In this entry (i.e., a CNAME type resource record), mn.an1.mob is the global-FQDN (global identifier) of the mobile node, and exyz.an3.mob is the local-FQDN of the mobile node within the visited access network N3.

The visited access network N3 comprises, similar as the home access network N2, an access gateway AGW3 and an authoritative sub level domain (SLD) name server ANS3 (in the following also simply referred to as name server ANS3) for the zone an3.mob, which is the visited access network. The name server ANS2 holds the following zone file entries for the mobile node MN:

exyx.an3.mob IN A a.b.c.d
; SRV pseudo-configuration
@ORIGIN exyz.an3. mob
_service SRV 0 1 "service port" exyz.an3.mob Thus, the name server ANS3 holds a type A resource record (A RR) in which the local-FQDN (exyz.an3.mob) is mapped to the private IP address in the visited access network N3, namely a.b.c.d, in this example. Furthermore, the name server ANS3 holds a service type (SRV type) resource record (RR), which indicates the service port of the mobile node identified by the local-FQDN in the visited access network N3.

Figure 2:
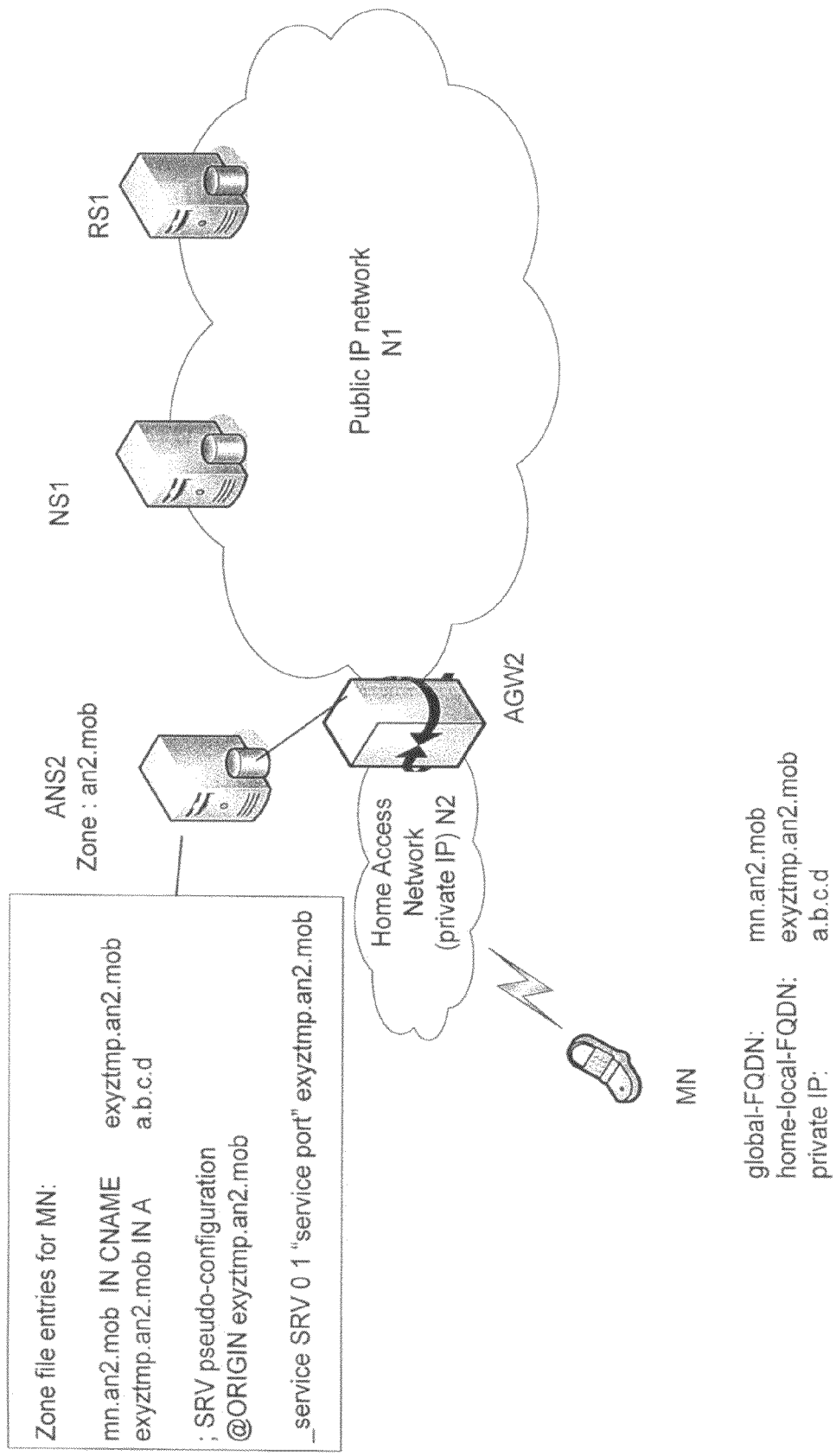
FIG. 2 shows domain name system setup in a private IP scenario when a mobile node is in its home network according to the first embodiment of the present invention.

FIG. 2 shows an example domain name system (DNS) setup for a private IP scenario (port mapping e.g. NAT/NAPT) when the mobile node MN is in its home network. In FIG. 2, similar elements are denoted by the same reference numbers as in FIG. 1. That is, the public IP network N1 also comprises the root server RS1 and the name server NS1. The home access network N2 comprises the access gateway AGW2 and the name server ANS2. It is noted that in this example, the home access network (or home zone of the mobile node MN) is a private IP network.

The situation is similar to the roaming case illustrated in FIG. 1. However, when the home network has private address space, due to restrictions of simultaneous use of A/AAAA/A6 and CNAME resource record for a canonical name, the home zone needs to assign the mobile node another temporary FQDN, which is referred to as home-local-FQDN or home-local-identifier. The host, i.e., the mobile node MN, remains reachable via global-FQDN.

The zone file entries in the name server ANS2 for the mobile node are as follows:

mn.an2.mob IN CNAME exyztmp.an2.mob
exyztmp.an2.mob IN A a.b.c.d
; SRV pseudo-configuration
@ORIGIN exyztmp.an2.mob
_service SRV 0 1 "service port" exyztmp.an2.mob Thus, the name server ANS2 holds a CNAME type resource record (CNAME RR) in which the global-FQDN (mn.an2.mob) of the mobile node MN is mapped to the home-local-FQDN (exytmp.an2.mob), a type A resource record (A RR) in which the home-local-FQDN (exytmp.an1.mob) is mapped to the private IP address in the home access network N2, and a service type resource record (SRV RR), in which the service port is indicated.

Figure 3:
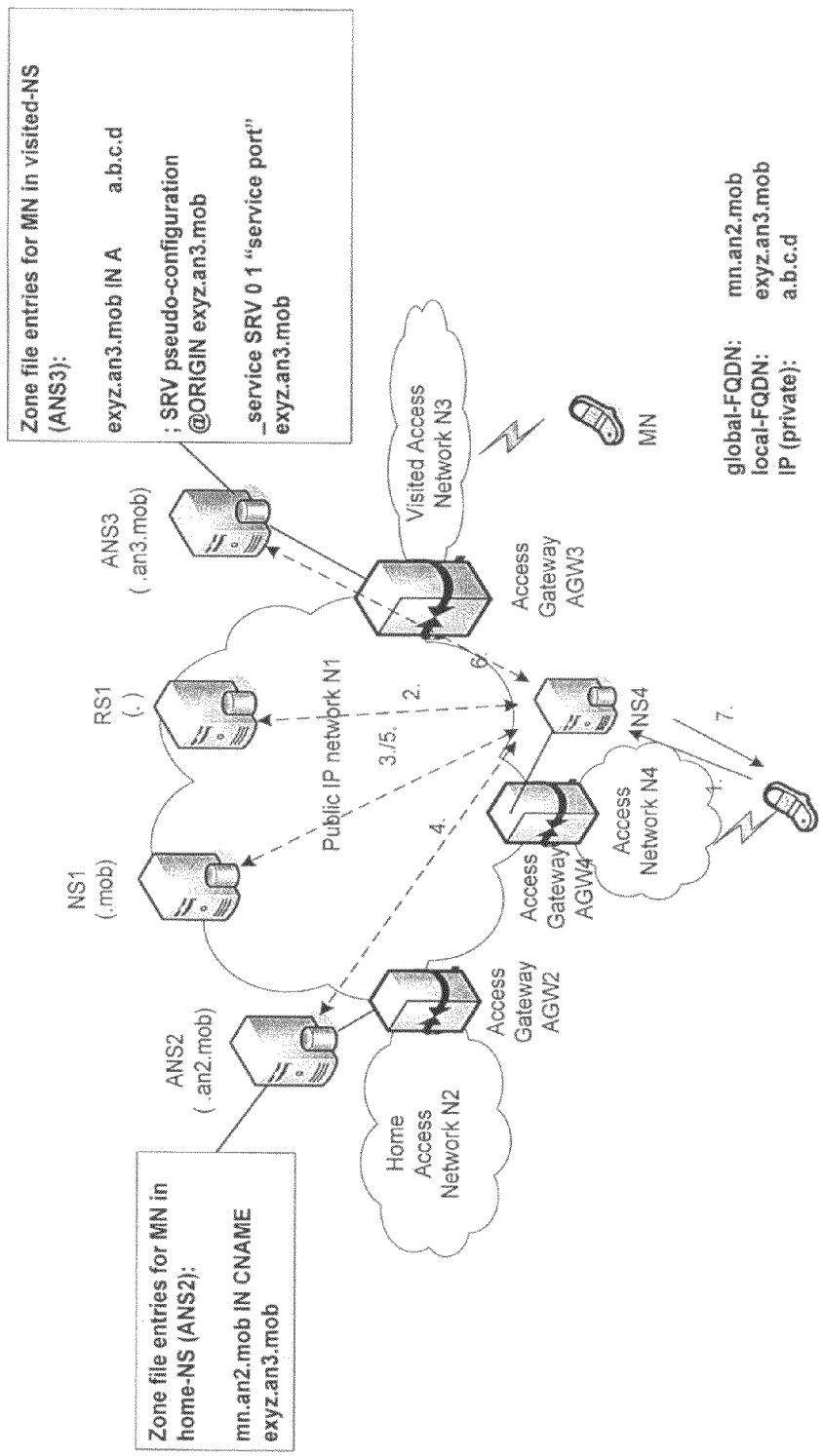
FIG. 3 shows a name resolution in the private IP scenario when a mobile node is roaming according to the first embodiment of the present invention.

FIG. 3 shows an example name resolution in private IP scenario (port mapping) for a roaming mobile node.

The situation is similar to that shown in FIG. 1, with the exception that here also a second mobile node CN (correspondent node) is shown, which tries to contact the first mobile node (the host) MN located in the private network N3. The second mobile node CN is located in an access network N4, which comprises an access gateway AGW4 and a name server NS4.

When the second mobile node CN contacts the first mobile node MN, several messages, i.e., queries and answers, are exchanged, which are indicated by the arrows and numbers.

In step 1, the mobile node CN issues a service query to the name server NS4 of its access network N4, i.e., query Qtype=SRV, QNAME="service@mn.an2.mob". That is, the mobile node sends a service request (the service being, e.g., connect) including the global-FQDN of the mobile node MN.

The name server NS4, in turn, resolves the service query based on the global-FQDN. In step 2, it accesses the root server RS1 with the query: Qtype=SRV, QNAME="service@mn.an2.mob", and obtains the answer referral to mob. In step 3, it accesses the top level domain server NS1 with the following query: Qtype=SRV, QNAME="service@mn.an2.mob", and obtains the answer: referral to an2.mob. Thus, the name server NS2 has the information regarding the home access network of the mobile node MN. Thereafter, in step 4, the name server NS4 sends a service query to the name server ANS2 (authoritative sublevel domain name system server ANS2), namely Qtype=SRV, QNAME="service@mn.an2.mob". The name server ANS2 sends the answer mn.an2.mob IN CNAME exyz.an3.mob. That is, the name server ANS2 informs the local-FQDN of the mobile node MN in the visited access network N3 as an alias name using CNAME. In step 5, the name server NS4 obtains the IP address of the visited access network by sending a corresponding query to the name server NS1, namely Query Qtype=SRV, QNAME="service@exy.an3.mob". The name server NS1 answers with referral to an3.mob. It is noted that the steps 2 to 5 are carried out as a recursion.

In step 6, the name server NS4 sends a service query to the name server ANS3 (authoritative sublevel domain server ANS3) of the visited access network N3, namely Qtype=SRV, QNAME="service@exy.an3.mob". The name server ANS2 answers with service@exy.an3.mob in SRV 0 1 "AGW3 port" "AGW3 IP". That is, in this step the name server NS4 obtains the port of the access gateway AG3 of the visited access network and the IP address of the access gateway AGW3. In step 7, an answer is given to the mobile node CN, namely service@exy.an3.mob in SRV 0 1 "AGW3 port" "AGW3 IP", i.e., the answer received from the name server ANS3.

After this, the CN can start a connection request to the mobile node MN in the visited access network N3 (i.e., the private network) by using the public IP address and the port number of the access gateway AGW3, which will translate this to the private IP address and port of the mobile node MN in the access network N3.

Moreover, it is noted that in order to simplify the description, only the SRV and one A RR is shown. However, according to standard DNS, the answer may contain SRV RR and one to many A RRs related to the domain name in SRV RR. That is, in this example, "AGW3 IP" is used to illustrate the A RR.

It is noted that in the above process, the step 6 is carried out using a non-standard functionality from the serving name server, i.e., from the authoritative sublevel domain name system (DNS) server ANS3 (in the following also simply referred to as name server ANS3). This non-standard functionality is presented in FIG. 4 described in the following.

Moreover, it is noted that depending on the DNS configurations, recursion may take place also in home zone server. That is, the order of the queries and the network elements involved are not limited to the example described above. It is noted that recursion is standard DNS procedure. The name server NS4 in the example may have name server (NS) resource records (RRs) in its local cache, which can be used to decrease number of iterative queries during recursion.

FIG. 4 shows the non-standard name server and network address (NA) functionality (port mapping) as mentioned above.

In steps S0.1 and S0.2, a preparation process is illustrated: namely, a dynamic host configuration protocol (DHCP) server of the visited access network allocates the local-FQDN including the private IP address to the mobile node MN (which is indicated here also as the private host). In particular, the DHCP server sends this information in step S0.1 to the mobile node MN and sends it to the name server ANS3 in step S0.2. After this, a service registration is performed in step S0.3 between the mobile node MN and the ANS3. It is noted that the invention is not limited to DHCP server, but that also other suitable entities can perform this.

In steps S6.1 to S6.6., the details of the step 6 of FIG. 3 described above are shown in more detail. In particular, the public host (i.e., in this case the name server NS4 in connection with the mobile node MN) sends the DNS Query SRV service@exyz.an3.mob to the name server ANS3. In step S6.2, the name server ANS3 sends a request to allocate a state (Local-FQDN, IP (private), service port #) including the service port and the private IP address to the access gateway AGW3. In step S6.3, the access gateway AGW3 allocates state and assigns IP and port pair for connection, e.g., NAT. In more detail, the access gateway contains a network address translation (NAT) function, so that the NAT function of the access gateway performs allocation of the state and assignment of the port. In step S6.4, the access gateway AGW3 informs the public IP address and the port number to the name server ANS3. In step S6.5, the name server ANS3 updates the access gateway IP address (AGW3 IP) instead of the private IP address of the mobile node MN and the AGW3 port # to the DNS answer. Thus, in step S6.6, the answer is given as: "mailto:service@exzyz.an3.mob" in AGW3 port#, AGW3 IP. Hence, after this, the public host (i.e., the name sever NS4 and the mobile node CN) knows the public address and the port of the access gateway AGW4, and the access gateway knows that it has to map its address and port to the private address and port of the mobile node CN.

In steps S11.1 to S11.3, a connection request is illustrated. In detail, in step S11.1, the public host sends a connection request including the public IP address and port of the access gateway AGW3 to the access gateway AGW3. The access gateway AGW3 maps this to the private address and port in the private network, i.e., the visited access network N3 in step S11.2. In step S11.3, the connection request is forwarded to the mobile node MN using the private address and port of the mobile node MN.

It is noted that according to an alternative of the present embodiment, another negotiation between NS and AGW is possible. In detail, the presented 1 transaction model (steps 6.2-6.5) can be finished within two transactions by first carrying out a negotiation regarding the service port, and after this a negotiation regarding the IP address.

Hence, according to the present embodiment, a mobile node located in a private network can be reached from a public network by using almost standard domain name system functions. That is, the global host and service reachability problem is solved with almost fully standard means.

It is noted that no clear prior-art exist for global and generic host and service reachability in this scenario.

Moreover, as long as a local FQDN remains unchanged, a host may change its local address without updating the global DNS.

If IP address changes in the serving network, only the serving zone name server requires dynamic updating (as long as local-FQDN remains)→Serving zone may cover several IP subnets.

Furthermore, it is noted that the solution according to the present embodiment also works in private networks having coherent address space e.g. operator networks.

Furthermore, according to the embodiment, no additional boxes are introduced.

Moreover, the embodiment does not require any sort of keep-alive-signaling to be reachable, whereas prior-art does. This means that a mobile node can remain in idle/sleep radio mode to save battery and still be reachable.

It is noted that according to the embodiment above, the SRV RR was used. However, the embodiment is not limited to this, and alternatively NAPTR RR could be used instead of SRV RR.

Figure 5C:
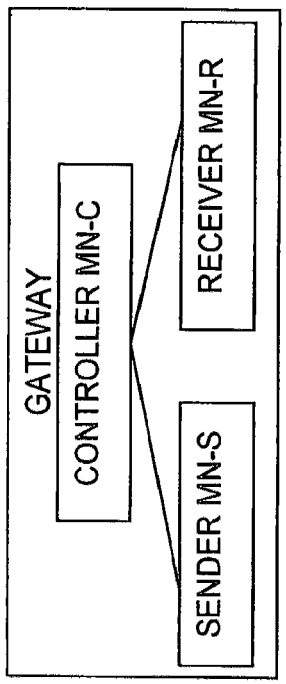
Figure 5A:
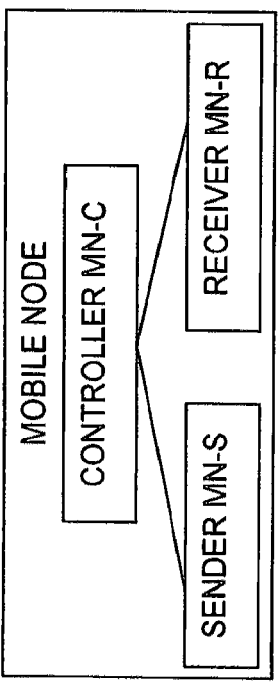

The nodes as described above may have a receiver MN-R, a sender MN-S and a controller MN-C, as illustrated in FIG. 5A, for example. In particular, the controller MN-C may include a CPU and different kinds of memory means such as RAM, ROM, a harddisk, a CD ROM reader or the like. A computer program may be stored in the memory means and may comprises software code portions for carrying out the method according to the embodiment. This computer program may be stored on a recording medium such as a CD ROM, for example, and may be directly loadable into the work memory of the controller. Alternatively, the computer program may be loaded via the network into the memory of the controller.

Figure 5B:
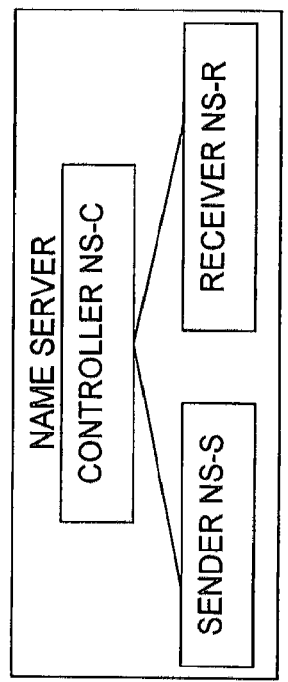

The name servers NS1, NS4, ANS2, ANS3, wherein in particular the name server ANS3 is an example for a network element for implementing the embodiment, may be structured as shown in FIG. 5B. That is, similar as the mobile nodes, the name servers may have a receiver NS-R, a sender NS-S and a controller NS-C. The controller may be structured in the same way as the controller of the mobile nodes, i.e., may include a CPU and different kinds of memory means such as RAM, ROM, a harddisk, a CD ROM reader or the like. The memory means may also comprise a database for storing mappings, identifiers of several mobile nodes and the like. A computer program may be stored in the memory means and may comprises software code portions for carrying out the method according to the embodiment. This computer program may be stored on a recording medium such as a CD ROM, for example, and may be directly loadable into the work memory of the controller. Alternatively, the computer program may be loaded via the network into the memory of the controller.

Moreover, the principle structure of the access gateways AGW2, AGW3 and AGW4 as examples for a gateway device is shown in FIG. 5C. Similar as the name servers, the access gateways may have a receiver AGW-R, a sender AGW-S and a controller AGW-C. The controller may be structured in the same way as the controller of the name server, i.e., may include a CPU and different kinds of memory means such as RAM, ROM, a harddisk, a CD ROM reader or the like. The memory means may also comprise a database for storing mappings, identifiers of several mobile nodes and the like. A computer program may be stored in the memory means and may comprises software code portions for carrying out the method according to the embodiment. This computer program may be stored on a recording medium such as a CD ROM, for example, and may be directly loadable into the work memory of the controller. Alternatively, the computer program may be loaded via the network into the memory of the controller.

It is noted that the senders and receivers mentioned above may comprise suitable interfaces which are configured for possible different access technologies of the network concerned.

In the following, an implementation example is described as a second embodiment of the present invention, according to which the first embodiment described above is applied in connection with mobile internet protocol (Mobile IP, MIP).

In MIP each mobile node is identified by its Home Address (HoA), regardless of it's current point of attachment in the network. While situated away from its home (roaming), a mobile node is also associated with a Care-of Address (CoA), which provides information about its current point of attachment to the Internet. At all times, when the host is roaming, its home agent (HA) maintains a mapping between HoA and CoA.

The problem that is described in the following is about the case when home agent address and host's home and care-of-address are from private IP address space, namely the case when access networks are behind NA(P)T and home agent is located in the access network. If the home address is from the private address space, it no longer can be used as host's global identifier. Moreover, reaching the home agent having private address is impossible from the public network with existing solutions.

According to the present embodiment, a globally unique Fully-Qualified-Domain-Name (FQDN) is used as a host global identifier, so that it is achieved that the host (and its services) has one reachable address from the private mobile network by means which the standard domain name system (DNS) provide.

One of the problems with Mobile IPv4 (and v6) is that it doesn't provide solution for host reachability for the case described above. Namely, the problem is that private home agent address and/or home address cannot be reached from the public network.

Considering the differences on mobile management protocols between Mobile IPv4 and IPv6, the same solution for middle-box traversal may not be feasible; i.e. the use of TCP/IP transport protocol vs. the use of L3 extensions.

In the following, a solution is described how host reachability and host mobility can be established in the scenario described above in case of MIPv4. The solution uses both features as described above in a more general way and MIPv4.

Because in MIP host always have identifier in the home network (home address), from host reachability point of view, it is enough to provide reachability to it's home address (and MIP will take care of the rest).

In this solution the home address is made reachable by using modified solution of the first embodiment described above, where the home address replaces the local-FQDN. Namely "Mobile node in home network having private address" scenario from the invention is used.

Before roaming mobile host can be reached, it naturally needs to register itself to visited domain foreign agent (FA), who relays registration to it's home agent (HA) in the home network. If foreign agent and home agent have private IP, this is not possible with existing solutions.

According to the present second embodiment, the following solution is provided: Because registrations from foreign agent and roaming host in MIPv4 are sent to the home agent IP address, NA(P)T has a preconfigured entry for the home agent. The information of this preconfigured entry should be known by a mobile host before it is able to contact its home agent from a visited network. This can be achieved through a mobile host's preconfiguration, DNS service resolution/discovery based on a SRV RR (the home domain/home agent name has a SRV RR associated containing this preconfigured information for use of MIP protocol; e.g. "mailto: mip@myhomeagent.an2.mob" or any other discovery mechanisms. All MIPv4 registrations are sent via this entry. Alternatively, there can be specific home agent entry for each roaming host.

NA(P)T Map: (NAPT IP, NAPT port #)→(home agent IP, port=434)

It is noted that the home agent discovery based on DNS as described above, is independent on the existence of NA(P)T and private address spaces and an example is represented below.

A RR:

HomeAgent-FQDN→a preconfigured IP address used by NA(P)T (public)

SRV RR:

"MIP service"→"MIP service port preconfigured in a NA(P)T" "HomeAgent-FQDN" (pseudo)

It is noted that the RFC3519 defines used port number (434) in home agent and is mentioned here to clarify how mobile host can register to home agent from the private network. This registration makes mobile host visible to the home agent (HA), which is required to make mobile host reachable via home agent. So, this functionality helps to make reachability work from CN to mobile host. The present embodiment handles the CN to home agent part of the reachability and gives home agent public IP address (NAT entry) and the RFC3519 fulfills the empty gap between home agent and mobile host.

When the host is registering in the visited network, it provides the home agent's public contact information to foreign agent (e.g. as part of the registration information), which could be either a DNS name of the home agent, the home agent's IP address and port used by a NA(P)T or any other (adequate) identifier. This enables foreign agent relay registration to home agent (via home network NA(P)T).

After the foreign agent has sent host registration to the home agent, a tunnel is established between the home agent and the foreign agent and data path from home network to visited network is ready (RFC3519 specifies how NAPT traversal can be done in MIPv4).

At this point, the home agent can reach foreign agent and visa versa.

In the following, a scenario of a random correspondent node (CN) is described, i.e., how a random correspondent node which wants to establish connection to roaming host, can reach host's private HoA.

According to the present embodiment, a DNS based means for reaching host from private network via globally unique FQDN is introduced, as described above in connection with the first embodiment:

Thus, according to the present second embodiment, the HoA is made reachable by maintaining one A RR and one SRV RR per "service" for each host in the home network authoritative name server (ANS):

A RR:
global-FQDN→home address (private)
SRV RR:
"service"→"service port" "global-FQDN" (pseudo)

It is noted that the home authoritative name server (home-ANS, e.g., similar to ANS2 shown in FIG. 2) is, according to the present embodiment, connected to the public DNS framework and because HoA is private IP address, it is not possible to use prior-art global-FQDN to home address mapping directly.

The correspondent node starts reaching the mobile host (and service) by enabling service location query to host's global-FQDN ("service"@"global-FQDN"). Eventually (after possible recursion in the public DNS framework) this query is received in the host's home-ANS and processed there. During the processing, the authoritative name server (ANS) negotiates a temporary state for the correspondent node (CN) with the home network NAT, who pre-configures a port for the CN connection and returns port number to the authoritative name server (ANS). The authoritative name server will add this received NAT port number, instead of "service port" number in SRV, to the DNS answer, which is sent to correspondent node. The answer to the correspondent node's SRV query contains assigned "NA(P)T port number" and host's "global-FQDN". The correspondent node receives the answer, and the correspondent node initiates a name query to figure IP behind global-FQDN. The authoritative name server receives the A query and negotiates NAPT again. NAPT finalizes pre-configuration and does rest of the required public to private parameter mappings resulting following state in NAPT:

CN MAP: (NAPT IP, NAPT Port #)<->(home address, service port)

As a response to the authoritative name server, the NA(P)T returns it public address relating to the correspondent node specific entry. The NA(P)T may have more than one public IP, which the authoritative name server (ANS) adds to the DNS answer, instead of the host home address from the A resource record. The correspondent node receives the answer and after processing, it can reach the home address by sending connection request to configured "NA(P)T IP" and "CN port".

This solution according to the second embodiment does not require dynamic updates to DNS, when the care-of address (CoA) changes. Only when host's service configuration changes dynamic updates are needed to update SRV records.

Dynamic updates need to be done only in the home domain; i.e. they don't have any impacts to the outside.

The DNS entries are the same for both scenarios (host at home and host roaming).

Home agent can be located in the private access network and have private IP address.

Figure 6:
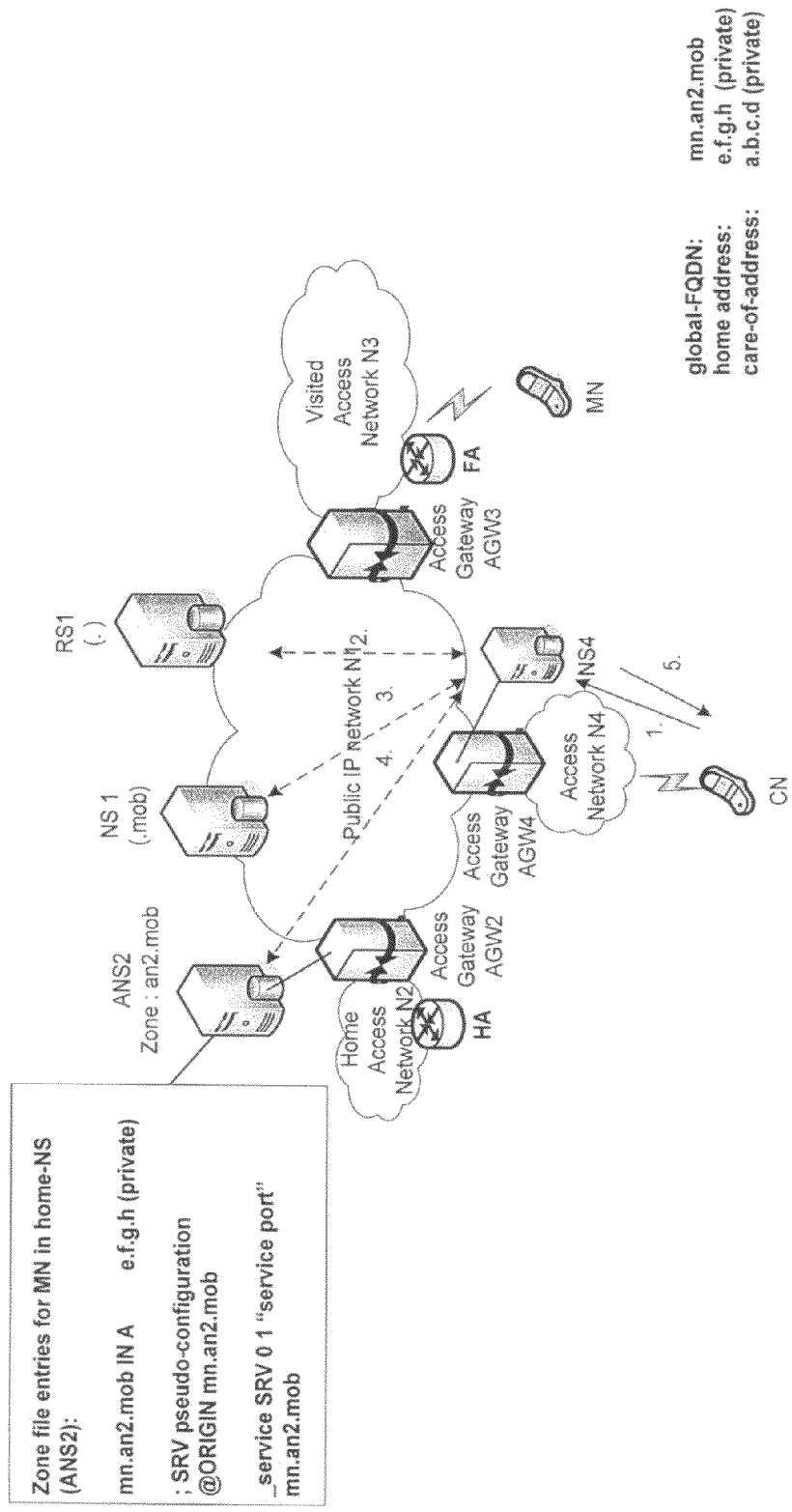
FIG. 6 shows a name resolution in the private IP scenario when a mobile node is roaming according to the first embodiment of the present invention.

An example is described in the following by referring to FIG. 6. The situation is similar to that of FIG. 3 according to the first embodiment, so that in the following basically only the differences are described.

The zone file entries in the name server ANS2 for the mobile node MN are as follows:

mn.an2.mob IN A e.f.g.h (private)
; SRV pseudo-configuration
@ORIGIN exyztmp.an2.mob
_service SRV 0 1 "service port" mn.an2.mob.

That is, the global-FQDN of the mobile node MN located in the visited network is mn.an2.mob, the home address is e.f.g.h (private) and the care-of-address is a.b.c.d (private).

Thus, in step 1, the second mobile node or correspondent node CN sends a query: Qtype=SRV, QNAME="mailto:service@mn.an2.mob" to the name server NS4 of the access network N4. The name server NS4, in turn, resolves the service query based on the global-FQDN, similar as according to the first embodiment. That is, in step 2, it accesses the root server RS1 with the query: Qtype=SRV, QNAME="service@mn.an2.mob", and obtains the answer referral to mob. In step 3, it accesses the top level domain server NS1 with the following query: Qtype=SRV, QNAME="service@mn.an2.mob", and obtains the answer: referral to an2.mob. Thus, the name server NS4 has the information regarding the home access network of the mobile node MN. Thereafter, in step 4, the name server NS4 sends a service query to the name server ANS2 (authoritative sublevel domain name system server ANS2), namely Qtype=SRV, QNAME="service@mn.an2.mob". The name server ANS2 sends the answer "mailto:service@mn.an2.mob" IN SRV 0 1 "AGW2 port" "AGW2 IP". In step 5, an answer is given to the correspondent node CN, namely service@exy.an2.mob in SRV 0 1 "AGW2 port" "AGW2 IP", i.e., the answer received from the name server ANS2.

Moreover, similar as described above in connection with FIG. 3, it is noted that in order to simplify the description, only the SRV and one A RR is shown. However, according to standard DNS, the answer may contain SRV RR and one to many A RRs related to the domain name in SRV RR. That is, in this example, "AGW2 IP" is used to illustrate the A RR.

The invention is not limited to the embodiments described above.

The mobile nodes are only an example for an arbitrary node in a network. In particular, the node does not have to be mobile. The embodiments described above can be applied to any node which may have a private address within a private network and which should be reachable from the outside.

Thus, according to embodiments of the present invention as described above, global reachability (both host and service) is enabled, and features of standard DNS are used to do it. The solution described above is agnostic to the host location, i.e., it solves reachability issue for hosts in the private network. Additionally, the solution as described in the embodiments is service agnostic and is not specifically designed for a particular set of services.

Hence, according to the embodiments, the problem is solved that, in order to be able to reach both host and the service host provides in the private domain, connecting peer from the public domain requires the IP address and the port number of NA(P)T, that are mapped to the host and the service behind it. The embodiments described above show how the peer gets these NA(P)T parameters and how the mapping between public and private domain parameters is setup and handled.

According to one aspect, a method is provided for handling connections in a communication system, comprising
  receiving a service query for requesting a service concerning a first node, located in a first network having a private address space, from a second node, the service query comprising a global identifier of the first node,
  obtaining a local identifier of the first node for identifying the first node in the first network,
  sending the local identifier of the first node to a network element providing a connection to the first node,
  receiving a public identifier of the network element, and
  sending the public identifier of the network element to the second node.

The method may further comprise allocating a state in the network element in which a mapping between the public identifier of the network element and a private identifier of the first node is established.

In the method, the public identifier of the network element may comprise a public address and a public port of the network element, and the private identifier of the first node may comprise a private address and a private service port.

In the method, in the response to receiving the service query, a mapping between the public port of the network element and the private service port of the first node may be established, and a mapping between the public address of the network element and the private address of the second node may be established.

In the method, the local identifier may be a local fully qualified domain name, and the global identifier may be a global fully qualified domain name.

In the method, the network element may be a gateway device of the first network.

In the method, the local identifier may be a care-of address of the first node.

In the method, the network element may be a gateway device of a home network of the first node.

According to a further aspect, a network element is provided which comprises a receiver configured to receive a service query for requesting a service concerning a first node located in a network having a private address space from a second node, the service query comprising a global identifier of the first node, a controller configured to obtain a local identifier of the first node for identifying the first node in the first network, a sender configured to send the local identifier of the first node to a network element providing a connection to the first node, wherein the receiver is further configured to receive a public identifier of the network element, and the sender is further configured to send the public identifier of the network element to the second node.

The controller may be further configured to send a request to allocate a state to the network element in which a mapping between the public identifier of the network element and a private identifier of the first node is established.

The public identifier of the network element may comprise a public address and a public port of the network element, and the private identifier of the first node may comprise a private address and a private service port.

The controller may be configured to establish, in response to receiving the service query, a mapping between the public port of the network element and the private service port of the first node and a mapping between the public address of the gateway device and the private address of the second node by sending a corresponding request to the network element.

The local identifier may be a local fully qualified domain name, and the global identifier is a global fully qualified domain name.

The network element may be a gateway device of the first network.

The local identifier may be a care-of address of the first node.

The network element may be a gateway device of a home network of the first node.

The network element may be a name server.

According to a further aspect, a method is provided for handling connections in a communication system, comprising receiving a request for allocating a state, the request comprising a local identifier of a first node, located in a first network having a private address space, for identifying the first node in the first network, allocating a state in which a mapping between the public identifier of a network element providing a connection to the first node and a private identifier of the first node is established, and sending the public identifier of the network element to a network node from which the request was received.

In the method, the public identifier of the network element may comprise a public address and a public port of the network element, and the private identifier of the first node may comprise a private address and a private service port.

In the method, upon allocating the state, a port number may be assigned, and a mapping between a private address of the first node and a public address of the network element may be established, and the assigned port number and the public address of the network element may be sent to the network element having sent the request.

In the method, the local identifier may be a local fully qualified domain name, and the global identifier may be a global fully qualified domain name.

In the method, the network element providing a connection to the first node may be a gateway device of the first network, and the method may be carried out by the gateway device.

In the method, the local identifier may be a care-of address of the first node.

In the method, the network element providing a connection to the first node may be a gateway device of a home network of the first node, and the method may be carried out by the gateway device.

According to a further aspect, a network element is provided comprising a receiver configured to receive a request for allocating a state, the request comprising a local identifier of the first node for identifying a first node in a first network having a private address space, a controller configured to allocate a state in the network element in which a mapping between the public identifier of the network element and a private identifier of the first node is established, and a sender configured to send the public identifier of the network element to another network element having sent the request.

The public identifier of the network element may comprise a public address and a public port of the network element, and the private identifier of the first node may comprise a private address and a private service port.

The receiver may be configured to receive a request for allocating a state, and the controller may be configured to allocate the state in the network element, in which a port number is assigned and in which a mapping between a private address of the first node and a public address of the gateway device is established.

The local identifier may be a local fully qualified domain name, and the global identifier may be a global fully qualified domain name.

The network element may be a gateway device of the first network.

The local identifier may be a care-of address of the first node.

The network element may be a gateway device of a home network of the first node.

According to a further aspect, a method is provided for obtaining connection information to a first node located in a first network having a private address space, comprising
sending a service query to a name server, the service query comprising a global identifier of the first node, and
receiving an answer comprising a public identifier of a network element providing a connection to the first node.

The global identifier may be a global fully qualified domain name.

According to a further aspect, a node is provided which comprises a sender, a receiver and a controller, wherein
the controller is configured to control the sender to send a service query to a name server, the service query comprising a global identifier of a first node located in a first network having a private address space, and
the receiver is configured to receive an answer comprising a public identifier of a network element providing a connection to the first node.

The global identifier may be a global fully qualified domain name.

According to a further aspect, a computer program product for a computer is provided, the computer program product comprising software code portions for performing the procedures described above in connection with the method aspects, when the program is run on the computer.

The computer program product may comprise a computer-readable medium on which the software code portions are stored.

According to a further aspect, a communication system is provided, which comprises a name server, a first node, a second node and a network element providing a connection to the first node, wherein
the first node is located in a first network having a private address space,
the second network node is configured to send a service query for requesting a service concerning the first node to the name server, the service query comprising a global identifier of the first node,
the name server is configured to obtain a local identifier of the first node for identifying the first node in the first network, and to send the local identifier of the first node to the network element providing a connection to the first node,
the network element is configured to allocate a state in which a mapping between a public identifier of the network element and the private identifier of the first node is established, and to send the public identifier of the network element to the name server, and
the name server is configured to send the public identifier of the network element to the second node.

The second node may be located in a private network or in a public network.

The local identifier may be a local fully qualified domain name, and the global identifier may be a global fully qualified domain name.

The network element may be a gateway device of the first network.

The local identifier may be a care-of address of the first node.

The network element may be a gateway device of a home network of the first node.

According to a further aspect, a network element is provided which comprises
means for receiving a service query for requesting a service concerning a first node located in a network having a private address space from a second node, the service query comprising a global identifier of the first node,
means for obtaining a local identifier of the first node for identifying the first node in the first network,
means for sending the local identifier of the first node to a network element providing a connection to the first node,
means for receiving a public identifier of the network element, and
means for sending the public identifier of the network element to the second node.

According to a further aspect, a network element is provided which comprises
means for receiving a request for allocating a state, the request comprising a local identifier of the first node for identifying a first node in a first network having a private address space,
means for allocating a state in the network element in which a mapping between the public identifier of the network element and a private identifier of the first node is established, and
means for sending the public identifier of the network element to another network element having sent the request.

According to a further aspect, a node is provided which comprises
means for sending a service query to a name server, the service query comprising a global identifier of a first node located in a first network having a private address space, and
means for receiving an answer comprising a public identifier of a network element providing a connection to the first node.

We claim:

1. An apparatus comprising at least one processor and at least one memory storing computer program code, wherein the at least one memory and stored computer program code are configured, with the at least one processor, to cause the apparatus to at least:
receive a service query for requesting a service concerning a first node located in a first network having a private address space from a second node, the service query comprising a global identifier of the first node;
obtain a local identifier of the first node for identifying the first node in the first network;
cause, responsive to receipt of the service query, a request to allocate a state comprising the local identifier of the first node to be sent to a network element providing a connection to the first node, wherein a mapping between a public identifier of the network element and a private identifier of the first node is established, wherein the public identifier of the network element comprises a public address and a public port of the network element, wherein the private identifier of the first node comprises a private address and a private service port, the mapping between the public identifier of the network element and the private identifier of the first node comprising a mapping between the public port of the network element and the private service port of the first node and a mapping between the public address of the network element and the private address of the first node;
receive the public identifier of the network element; and
cause the public identifier of the network element to be sent to the second node;
wherein the apparatus comprises or is embodied on a name server.

2. The apparatus according to claim 1, wherein the local identifier is a local fully qualified domain name, and the global identifier is a global fully qualified domain name.

3. The apparatus according to claim 1, wherein the network element is a gateway device of the first network.

4. The apparatus according to claim 1, wherein the local identifier is a care-of address of the first node.

5. The apparatus according to claim 4, wherein the network element is a gateway device of a home network of the first node.

6. An apparatus comprising:
means for receiving a service query for requesting a service concerning a first node located in a first network having a private address space from a second node, the service query comprising a global identifier of the first node;
means for obtaining a local identifier of the first node in the first network;
means for causing, responsive to receiving the service query, a request to allocate a state comprising the local identifier of the first node to be sent to a network element providing a connection to the first node, wherein a mapping between a public identifier of the network element and a private identifier of the first node is established, wherein the public identifier of the network element comprises a public address and a public port of the network element, wherein the private identifier of the first node comprises a private address and a private service port, the mapping between the public identifier of the network element and the private identifier of the first node comprising a mapping between the public port of the network element and the private service port of the first node and a mapping between the public address of the network element and the private address of the first node;
means for receiving the public identifier of the network element; and
means for causing the public identifier of the network element to be sent to the second node;
wherein the apparatus comprises or is embodied on a name server.

7. A method comprising:
receiving, at a name server, a service query for requesting a service concerning a first node located in a first network having a private address space from a second node, the service query comprising a global identifier of the first node;
obtaining a local identifier of the first node in the first network;
causing, responsive to receiving the service query, a request to allocate a state comprising the local identifier of the first node to be sent from the name server to a network element providing a connection to the first node, wherein a mapping between a public identifier of the network element and a private identifier of the first node is established, wherein the public identifier of the network element comprises a public address and a public port of the network element, wherein the private identifier of the first node comprises a private address and a private service port, the mapping between the public identifier of the network element and the private identifier of the first node comprising a mapping between the public port of the network element and the private service port of the first node and a mapping between the public address of the network element and the private address of the first node;
receiving, at the name server, the public identifier of the network element; and
causing the public identifier of the network element to be sent from the name server to the second node.

8. The method according to claim 7, wherein the local identifier is a local fully qualified domain name, and the global identifier is a global fully qualified domain name.

9. The method according to claim 7, wherein the network element comprises a gateway device of the first network.

10. The method according to claim 7, wherein the local identifier is a care-of address of the first node.

11. The method according to claim 10, wherein the network element comprises a gateway device of a home network of the first node.

12. A computer program product comprising at least one non-transitory computer-readable storage medium having computer-readable program instructions stored therein, the computer-readable program instructions comprising instructions, which when performed by an apparatus, are configured to cause the apparatus to at least:
receive a service query for requesting a service concerning a first node located in a first network having a private address space from a second node, the service query comprising a global identifier of the first node;
obtain a local identifier of the first node for identifying the first node in the first network;
cause, responsive to receipt of the service query, a request to allocate a state comprising the local identifier of the first node to be sent to a network element providing a connection to the first node, wherein a mapping between a public identifier of the network element and a private identifier of the first node is established, wherein the public identifier of the network element comprises a public address and a public port of the network element, wherein the private identifier of the first node comprises a private address and a private service port, the mapping between the public identifier of the network element and the private identifier of the first node comprising a mapping between the public port of the network element and the private service port of the first node and a mapping between the public address of the network element and the private address of the first node;
receive the public identifier of the network element; and
cause the public identifier of the network element to be sent to the second node;
wherein the apparatus comprises or is embodied on a name server.

* * * * *